(12) United States Patent
Andrews et al.

(10) Patent No.: US 11,964,862 B2
(45) Date of Patent: Apr. 23, 2024

(54) SYSTEM AND METHOD FOR MONITORING BEVERAGE DISPENSER

(71) Applicant: Walmart Apollo, LLC, Bentonville, AR (US)

(72) Inventors: Christine L. Andrews, Rogers, AR (US); Rohit C. Dharmadhikari, Bentonville, AR (US); Jose A. Estrada, Bentonville, AR (US); Mayra R. Harmon, Cave Springs, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 844 days.

(21) Appl. No.: 17/004,479

(22) Filed: Aug. 27, 2020

(65) Prior Publication Data

US 2022/0063981 A1    Mar. 3, 2022

(51) Int. Cl.

| | |
|---|---|
| B67D 1/08 | (2006.01) |
| B67D 1/00 | (2006.01) |
| G01G 17/04 | (2006.01) |
| G01G 23/18 | (2006.01) |
| G06Q 10/0631 | (2023.01) |
| G06Q 10/087 | (2023.01) |
| G06Q 10/105 | (2023.01) |
| G06Q 10/1093 | (2023.01) |
| G06Q 20/18 | (2012.01) |
| G06Q 30/0601 | (2023.01) |

(52) U.S. Cl.
CPC ........... *B67D 1/0888* (2013.01); *B67D 1/004* (2013.01); *G01G 17/04* (2013.01); *G01G 23/18* (2013.01); *G06Q 10/063114* (2013.01); *G06Q 10/06315* (2013.01); *G06Q 10/087* (2013.01); *G06Q 10/105* (2013.01); *G06Q 10/1097* (2013.01); *G06Q 20/18* (2013.01); *G06Q 30/0633* (2013.01)

(58) Field of Classification Search
CPC ...... B67D 1/0888; B67D 1/004; G01G 17/04; G01G 23/18; G06Q 10/063114; G06Q 10/06315; G06Q 10/087; G06Q 10/105; G06Q 10/1097; G06Q 20/18; G06Q 30/0633
See application file for complete search history.

(56) References Cited

U.S. PATENT DOCUMENTS

| | | |
|---|---|---|
| 8,442,674 B2 | 5/2013 | Tilton |
| 9,603,019 B1 | 3/2017 | Ramatchandirane |
| (Continued) | | |

*Primary Examiner* — Ishal Pancholi
*Assistant Examiner* — Robert K Nichols, II
(74) *Attorney, Agent, or Firm* — Foley IP Law, PLLC

(57) ABSTRACT

Systems, apparatuses, and methods are provided herein for monitoring beverage dispenser. A system for controlling beverage quality comprises a beverage dispenser monitoring unit comprising: a plurality of weight sensors each positioned below one of a plurality of syrup containers connected to a beverage dispenser, and a first network adapter configured to communicate with a control unit. The control unit configured to detect a low weight reading from a weight sensor of the plurality of weight sensors of the beverage dispenser monitoring unit via the second network adapter, determine a syrup container of the plurality of syrup containers associated with the weight sensor, and provide a notification of low syrup level indicating the syrup container to at least one of the plurality of user interface devices.

21 Claims, 3 Drawing Sheets

(56) References Cited

U.S. PATENT DOCUMENTS

| | | |
|---|---|---|
| 9,967,343 B2 | 5/2018 | Kim |
| 10,486,954 B2 | 11/2019 | Brun-Kestler |
| 2017/0313568 A1 | 11/2017 | Kelly |
| 2019/0330043 A1* | 10/2019 | Carpenter ............ B67D 1/0051 |
| 2019/0359470 A1* | 11/2019 | Joshi .................... B67D 1/0871 |

* cited by examiner

SYSTEM AND METHOD FOR MONITORING BEVERAGE DISPENSER

TECHNICAL FIELD

This invention relates generally to a beverage dispenser monitoring device.

BACKGROUND

A soda fountain generally refers to a device that dispenses carbonated soft drinks. They can be found in restaurants, concession stands, and other locations such as convenience stores. The device combines flavored syrup or syrup concentrate and carbon dioxide with chilled and purified water to make soft drinks.

BRIEF DESCRIPTION OF THE DRAWINGS

Disclosed herein are embodiments of apparatuses and methods for monitoring a beverage dispenser. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for controlling beverage quality. A system for controlling beverage quality comprises a beverage dispenser monitoring unit comprising: a plurality of weight sensors each positioned below one of a plurality of syrup containers connected to a beverage dispenser, and a first network adapter configured to communicate with a control unit. The control unit comprises a second network adapter configured to communicate with the beverage dispenser monitoring unit and a plurality of user interface devices, and a control circuit coupled to the second network adapter and configured to: detect a low weight reading from a weight sensor of the plurality of weight sensors of the beverage dispenser monitoring unit via the second network adapter, determine a syrup container of the plurality of syrup containers associated with the weight sensor, and provide a notification of low syrup level indicating the syrup container to at least one of the plurality of user interface devices.

Figure 1:
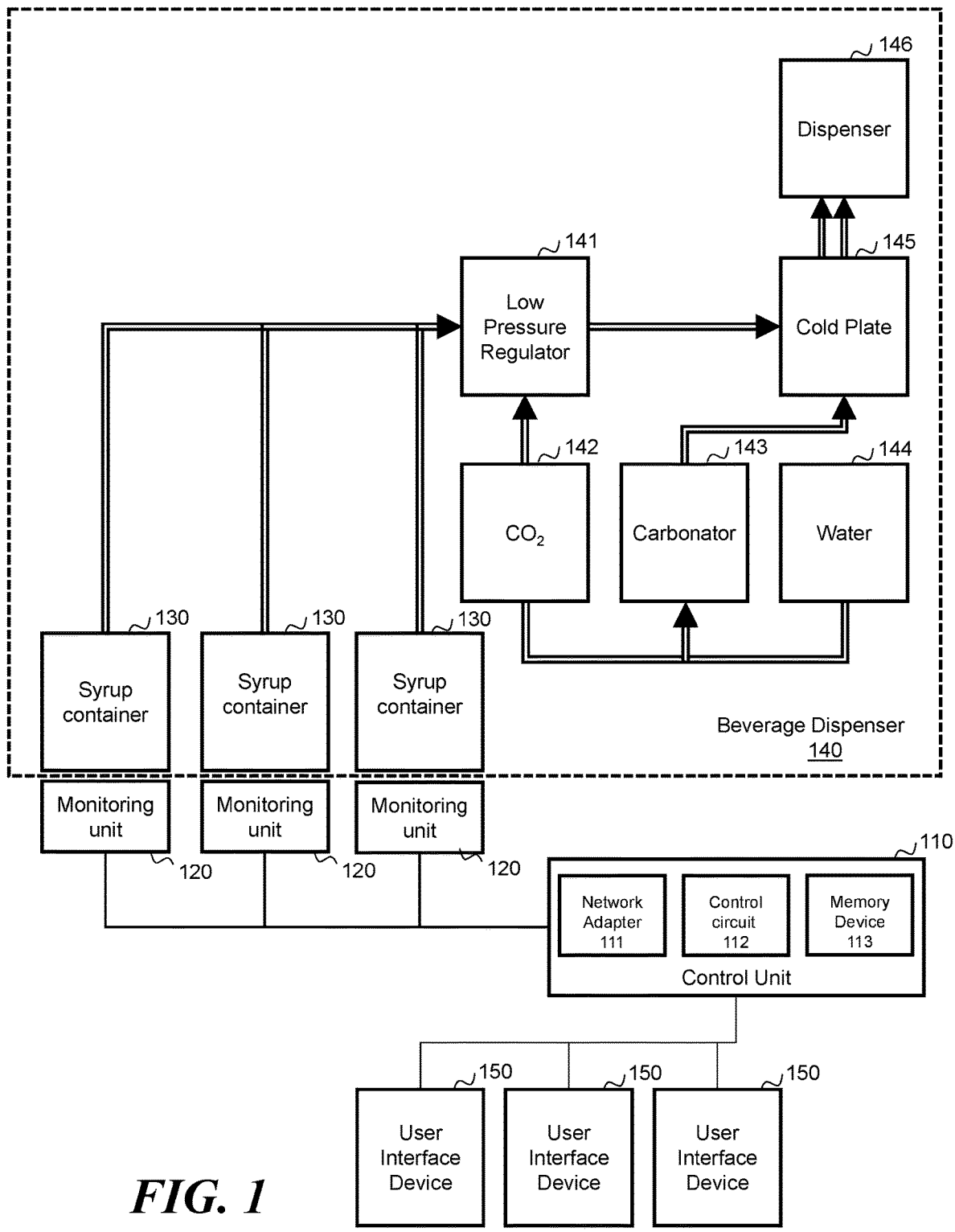
FIG. 1 is a block diagram of a system in accordance with several embodiments.

Referring now to FIG. 1, a system for controlling beverage quality is shown. The system comprises monitoring units 120 that monitors syrup containers 130 and communicates with a control unit 110 coupled to user interface devices 150. The syrup containers 130 supplies syrup to a beverage dispenser system 140.

The beverage dispenser system 140 includes a dispenser 146, a cold plate 145, a carbonator 143, a water source 144, a $CO_2$ source 142, and a low pressure regulator 141. The low pressure regulator 141 is configured to draw syrup from the syrup containers 130 and supply the syrup to the dispenser 146 through the cold plate 145. In some embodiments, two or more syrups may be mixed for a single drink at the low pressure regulator or the dispenser. The carbonator 143 is generally configured to combine $CO_2$ and water and output carbonated water. The cold plate 145 is generally configured to lower the temperature of both the syrup supplied through the low pressure regulation and the carbonated water supplied by the carbonator 143. The dispenser 146 is generally configured to combine the carbonated water and the syrup and dispense beverages in response to a selection at the dispenser. For example, a customer may press a button, a lever, or place a cup on a weight sensor or under a presence sensor, and the dispenser 146 would mix the corresponding syrup (e.g. root beer, cream soda, etc.) with carbonated water to dispense the selected drink. In some embodiments, syrup may be mixed with noncarbonated water at the dispenser 146 for noncarbonated beverages such as ice tea and juice drinks. In some embodiments, the beverage dispenser system 140 may further include an ice dispensing unit with an outlet connected to the dispenser 146.

The syrup containers 130 comprise containers for holding flavor syrups for beverages. In some embodiments, a syrup container 130 comprises a bag-in-a-box (BiB) container that includes a bladder made of plastics or film seated inside a corrugated fiberboard box. The BiB container further includes a fitment through which a connector to the low pressure regulator 141 can be attached to draw out the syrup in the container. In some embodiments, the syrup containers 130 may be stored on shelves apart from the dispenser 146. For example, syrup containers 130 may be stored on several levels of shelves in a syrup container closet, away from customer accessible areas such as restaurant seating areas and store sales floors. In some embodiments, the syrup containers 130 may be placed below or behind the dispenser 146. In some embodiments, a plurality of syrup containers 130 is connected to a single dispenser 146 to provide different flavors/types of beverages.

When a syrup container 130 is empty or near empty, the low pressure regulator 141 may continue to draw from the syrup container and output only a small volume of syrup to the cold plate 145. The dispenser 146 would then continue to dispense drinks by combining the small amounts of syrup with the normal volume of carbonated water, resulting in a flavorless drink. In some embodiments, monitoring units 120 are provided herein to detect the state of syrup containers and provide notifications to user interface devices 150 when a syrup container is low on syrup. In some embodiments, with the monitoring units 120, syrup containers may be replaced quickly to ensure the quality of dispense beverages.

The beverage dispenser system 140 is provided as an example only. Monitoring units 120 described herein may be used with a variety of types of beverage dispensers. In some embodiments, some elements of the beverage dispenser system 140 shown in FIG. 1 may be omitted and other elements may be added. For example, a beverage dispenser may dispense only noncarbonated beverages and omit the $CO_2$ source 142 and the carbonator 143. In another example, the beverage dispenser may be configured to dispense hot drinks (e.g. hot coffee) and include a heating element. In some embodiments, the beverage dispenser system 140 may include other common parts for dispensing beverages not shown in FIG. 1. In some embodiments, the beverage dispenser system 140 may be a conventional and/or commercially available beverage dispenser system 140 such as employee operated or customer self-service soda fountains found in restaurants and convenience stores.

A monitoring unit 120 comprises an electronic device configured to measure the weight of a syrup container 130. A monitoring unit 120 may comprise a weight sensor placed under a syrup container 130, a control circuit, and a network adapter configured to communicate with the control unit 110. In some embodiments, the monitoring unit 120 may be configured to periodically or continuously provide weight measurement readings to the control unit 110. In some embodiments, the monitoring unit 120 may be configured to determine whether weight sensor readings are above or below a weight threshold and communicate with the control unit in response to one of the weight sensor readings falling below the weight threshold. In some embodiments, the threshold value may be set or calibrated directly on the monitoring unit 120 or via the control unit 110. In some embodiments, different thresholds may be set for different syrup containers and/or weight sensors. In some embodiments, a plurality of weight sensors each placed under a different syrup container 130 may be connected to the same control circuit and network adapter. In some embodiments, the monitoring unit 120 may be configured to perform one or more steps described with reference to FIG. 2 An example of a monitoring unit 120 is described in more detail with reference to FIG. 3.

The control unit 110 generally comprises a processor-based system such as a server, a cloud-based server, a computer, a store management computer system, a merchant backend system, and the like. The control unit 110 comprises a network adapter 111, a control circuit 112, and a memory device 113 storing computer-executable codes configured to cause the control circuit to communicate with monitoring units 120 and provide notifications to user interface devices 150 relating to the status of syrup containers 130 being monitored by the monitoring units 120. In some embodiments, the control unit 110 may be configured to communicate with a plurality of monitoring units monitoring a plurality of beverage dispenser system 140. For example, a control unit 110 of a store may monitor two or more beverage dispensers inside the store. In some embodiments, the control unit 110 may further be configured to assign and manage store associate tasks based on information received from the monitoring units 120. In some embodiments, the control unit 110 may further be configured to store historical weight sensor readings from the plurality of weight sensors, determine an estimated future demand for each of the plurality of syrup containers based on the historical weight sensor readings, and automatically generate an order for one or more of the plurality of syrup containers based on the estimated future demand. In some embodiments, the control unit 110 may be configured to perform one or more steps described with reference to FIG. 2

The user interface devices 150 comprises devices configured to provide information from the control unit to users. In some embodiments, the user interface device 150 may comprise a wall-mounted display panel comprising light indicators each associated with one of the plurality of syrup containers monitored by the system. For example, the display panel may comprise a plurality of LEDs each corresponding to a syrup container. When a syrup container has a low weight measurement, the control unit 110 may cause the corresponding LED on the display panel to light up or change color (e.g. green to red). In some embodiments, the user interface device 150 may comprise a low syrup indicator on or near the beverage dispenser. For example, the control unit 110 may cause an indicator light to turn on on the dispenser 146 to function as an "out of order" notification to the employee or the customer operating the dispenser 146. In some embodiments, the user interface device 150 may comprise a portable device associated with store associates such as a mobile device, a smartphone, or a tablet computer carried by a store associate. In some embodiments, the user interface device 150 may provide a store associate task management user interface based on communications with the control unit 110. In some embodiments, the user interface device 150 may be configured to perform one or more steps described with reference to FIG. 2.

While monitoring units 120 are generally described herein as monitoring units for syrup containers, in some embodiments, the monitoring units 120 may include weight sensors for measuring the weight of other components of a beverage dispenser system 140. For example, a monitoring unit 120 can also be used to determine whether the $CO_2$ source 142 (e.g. $CO_2$ tank) needs to be replaced.

Figure 2:
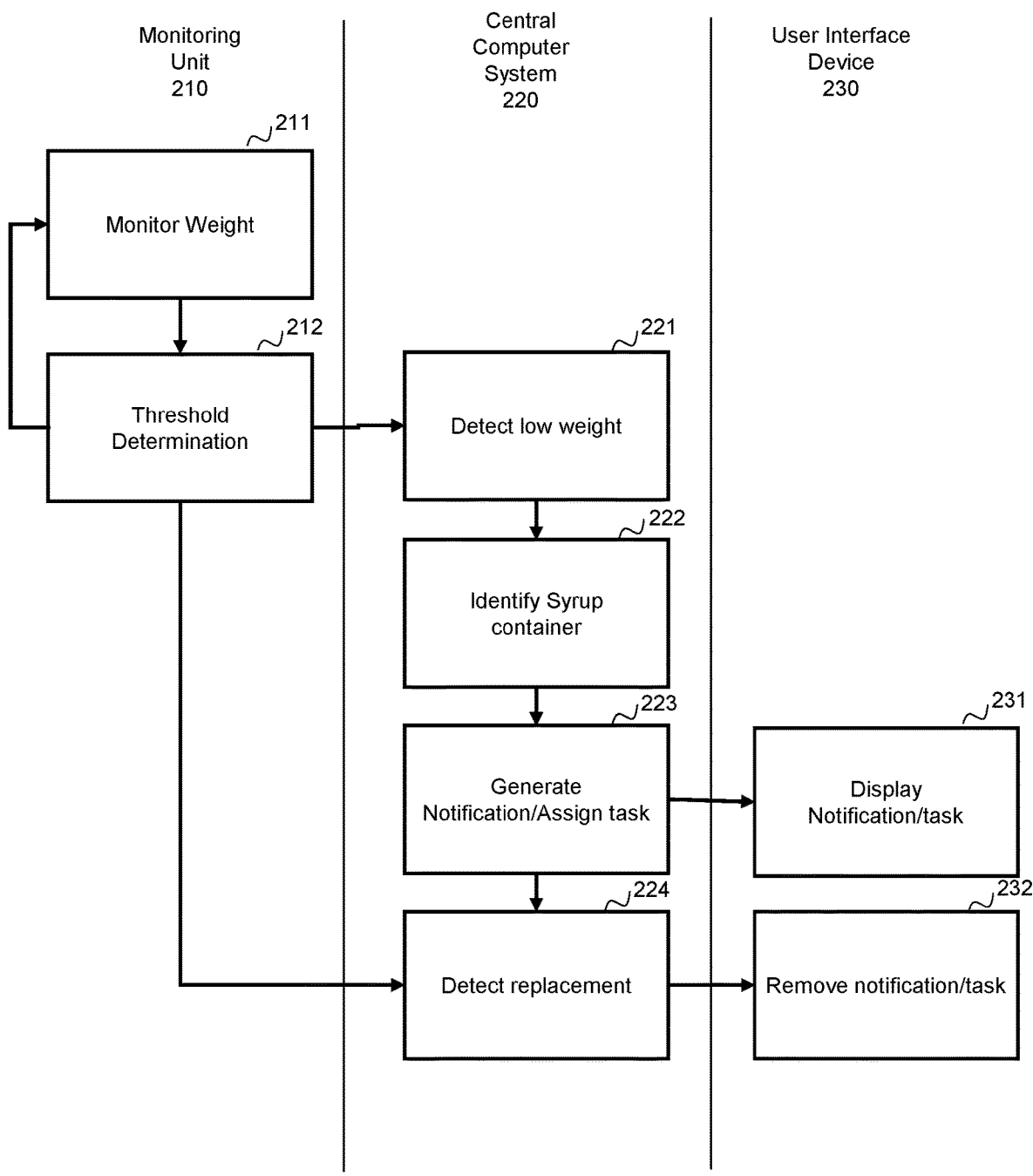
FIG. 2 is a flow diagram of a process in accordance with several embodiments.

Referring now to FIG. 2, a process for controlling dispensed beverage quality is shown. Generally, the steps shown in FIG. 2 may be implemented with processor-based devices. In some embodiments, the method shown in FIG. 2 may be implemented with the monitoring unit 120, the control unit 110, and the user interface device 150 described with reference to FIG. 1 or similar devices.

In block 221, the monitoring unit 210 monitors the weight of a syrup container by taking weight measurements. In some embodiments, the weight measurements may be taken continuously or periodically with a weight sensor and sent in a message to the control unit 220. In some embodiments, the message may further comprise one or more of a monitoring unit identifier, a weight sensor identifier, a dispenser identifier, or a syrup container identifier to identify the sensor/container to the control unit 220. In block 221, the control unit 220 receives the weight measurement from the monitoring unit and makes a threshold determination to determine whether a weight measurement is below a predetermined threshold associated with an empty or near-empty syrup container. If the measured weight is above the threshold, the control unit 220 may continue to receive weight measurements without further action. In some embodiments, the threshold determination may be made at the monitoring unit 210 instead, and the monitoring units 210 may only transmit a message indicating low syrup level to the control unit 220 when the weight sensor registers a weight below a threshold.

In some embodiments, after step 221, the control unit 220 may further identify the syrup container associated with the low weight measurement. In some embodiments, the syrup container may be identified based on a monitoring unit identifier, a weight sensor identifier, a dispenser identifier, or a syrup container identifier associated with the low weight measurement. For example, the monitoring unit 210 may comprise ten weight sensors monitoring syrup containers 1-10. The control unit 220 may maintain a table of monitoring units (e.g. #2) and weight sensor identifiers (e.g. #5)

and their corresponding syrup container and perform a table lookup. In some embodiments, the control unit 220 may further be configured to identify the syrup type (e.g. diet coke, orange soda) based on the syrup container identifier and associated syrup type stored in the lookup table. In some embodiments, the control unit 220 may further track the status of each syrup container and/or dispenser monitored by the system and store a status indicator (e.g. normal, syrup low, need replacement, disconnected) associated with each syrup container identifier and/or weight sensor identifier.

In block 223, the control unit 220 generates a notification of low syrup level indicating the syrup container to one or more user interface devices. In some embodiments, the control unit 220 may select one or more user interface devices to provide the notification based on one or more of store associate roles, shift schedules, and task assignments of store associates associated with each of the plurality of user interface devices. For example, the control unit 220 may select a particular associate or a group of associates to assign the task of replacing the syrup container and provide the notification only to portable user devices associated with the select associates. In some embodiments, the notification may be provided to multiple types of user interface devices such as wall-mounted display panels, cash registers, and portable user devices. In some embodiments, the control unit 220 may be configured to generate machine instructions to task an automated transport device to transport a replacement syrup container from a storage location to the location of the syrup container. In some embodiments, the control unit 220 may further instruct the automated transport unit to replace the syrup container without human intervention.

In block 231, the user interface device 230 displays notification and/or task assignment based on transmissions received from the control unit 220. In some embodiments, the user interface device 230 may comprise a wall-mounted display panel comprising light indicators each associated with a plurality of syrup containers monitored by the system. The control unit 220 may cause the corresponding light indicator to light up to indicate the syrup container that needs to be replaced. In some embodiments, the user interface device 230 may further provide a sound notification (e.g. beeps). In some embodiments, the user interface device may comprise a plurality of a low syrup indicator on or near the beverage dispenser. The control unit 220 may cause the corresponding indicator to be turned on in response to detecting low weight in block 221. In some embodiments, the user interface device 230 comprises a portable device associated with a store associate. For example, a user interface device 230 may comprise corporate handheld devices such as Cruize SM1 or Zebra TC72, standalone monitors, personal devices (e.g. bring your own devices, such as smart phones and tablets), corporate computers, corporate pagers and the lie. The notification may comprise a text message, an email, a pop-up notification, a drop-down menu notification, an in-app message, and the like, In some embodiments, the user interface device may execute a program or application and provides a store associate task management user interface that displays notification and tasks assigned/associated with the particular store associate. The control unit 220 may include the task of replacing a syrup container among a variety of tasks (e.g. open cash register 5, clean up aisle 3, refill napkins, assist customer in gardening section, etc.) assigned and managed via the store associate task management user interface. In some embodiments, the user interface device may comprise a point of sale (POS) system or cash register, and a notification may be provided to the cashier via a display screen. In some embodiments, the notification and/or task may indicate one or more of a beverage dispenser identifier, a syrup container location (e.g. by cash registers, back of the store, etc.), a syrup type (e.g. diet coke, orange soda), a syrup container storage location identifier (e.g. shelf 2, slot 4; first row, third from the right), and the like.

In block 224, the control unit 220 may detect the replacement of a syrup container based on weight measurements taken by weight sensors of the monitoring unit 210. For example, replacement may be detected when the measured weight exceeds a second threshold. In some embodiments, replacement detection may be performed at the monitoring unit 210 and the monitoring unit may transmit a message to the control unit 220 to indicate that the syrup container has been replaced. The control unit then causes the notification and/or task assignment to be removed from the user interface device 230 in block 232. For example, the control unit 220 may cause the corresponding indicator light to turn off on a wall-mounted panel. In some embodiments, after an associate replaces a syrup container, they may use the store associate task management user interface to indicate that the task has been completed and the control unit 220 may verify the completion of the task based on the weight sensor reading and/or threshold determination from the corresponding monitoring unit and close the task in the store associate task management user interface in response to detecting the replacement. In some embodiments, the task to replace the syrup container may be assigned to multiple associates, and the task may be closed for all associates upon the detection of the replacement. After the syrup container has been replaced, the monitoring unit may continue to monitor the weight of one or more syrup containers and provide weight measurements and/or messages to the control unit 220.

In some embodiments, the monitoring unit 210 may perform multiple instances of blocks 211 for a plurality of weight sensors placed under a plurality of syrup containers. In some embodiments, the control unit 220 is configured to perform multiple instances of blocks 211-224 for a plurality of weight sensors and/or monitoring units 210. In some embodiments, the user interface device 230 is configured to display multiple notifications and/or container status associated with multiple syrup containers and/or dispensers. For example, the control unit 220 may detect multiple syrup containers being low in syrup from different monitoring units 210, assign the task to replace each syrup container to a different associate, and separately determine whether each syrup container has been replaced.

In some embodiments, the control unit 220 further stores historical weight sensor readings from the plurality of weight sensors, determine an estimated future demand for each of the plurality of syrup containers based on the historical weight sensor readings and automatically generate an order for one or more of the plurality of syrup containers based on the estimated future demand. In some embodiments, the control unit 220 may record the times between syrup containers being replaced and being low in weight (e.g. empty) to estimate how frequently each syrup container needs to be replaced and when and how many syrup containers should be ordered.

Figure 3:
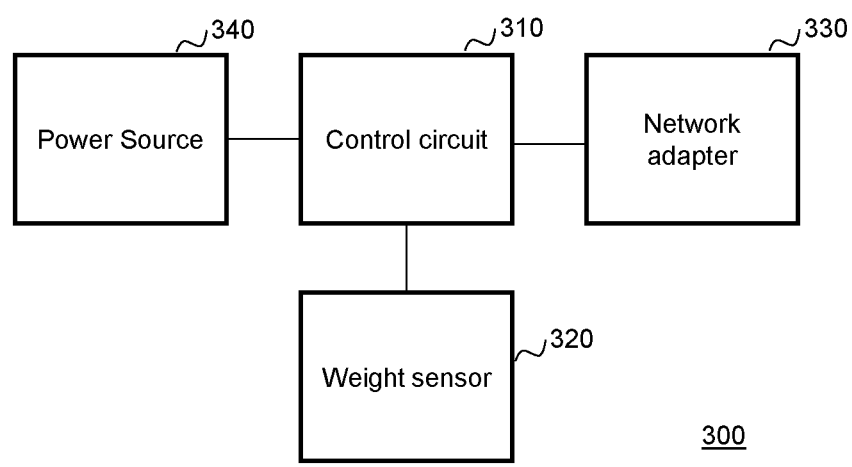
FIG. 3 is a block diagram of a beverage dispenser monitoring unit in accordance with several embodiments.

Next referring to FIG. 3, a block diagram of a beverage dispenser monitoring unit 300 is shown. The beverage dispenser monitoring unit 300 comprises a power source 340, a control circuit 310, a network adapter 330, and a weight sensor 320. In some embodiments, the beverage dispenser monitoring unit 300 may comprise the monitoring unit 120, the monitoring unit 210, and/or other devices.

The control circuit 310 may comprise one or more of a processor, a microprocessor, a central processing unit, an application-specific integrated circuit (ASIC), and the like. The control circuit 310 may further comprise a volatile and/or non-volatile computer readable storage memory device and wiring connections between one or more components of the control circuit and the power source 340, the network adapter 330, and the weight sensor 320. In some embodiments, the control circuit 310 may comprise a single-board computer such as the Raspberry Pi. The power source 340 may comprise an external or an internal power source connector. In some embodiments, the beverage dispenser monitoring unit 300 may be power by an electric grid via a power cord and/or powered by a battery. The weight sensor 320 may comprise an electronic device configured to convert weight measurement to an electronic signal for the control circuit 310. In some embodiments, the weight sensor may comprise a load cell such as one or more of a strain gauge load cell, a bending beam load cell, a pancake load cell, a canister load cell, a pneumatic load cell, a hydraulic load cell and the like. In some embodiments, the weight sensor 320 may be integrated into a plate that evenly supports the weight of a syrup container. In some embodiments, the weight sensor 320 may be integrated into a supporting structure (e.g. storage shelves, racks) that hold the syrup containers. In some embodiments, the weight sensor 320 may be integrated with a crate/tray that the syrup container sits on, which is placed on the shelf. In some embodiments, a beverage dispenser monitoring unit 300 comprises a plurality of weight sensors each configured to monitor a different syrup container. In some embodiments, each weight sensor may be individually adjusted for weight distribution and calibration.

The network adapter 330 may comprise a wired and/or wireless data connection that allows the control circuit 310 to communicate with other devices such as a control unit. In some embodiments, the network adapter 330 may comprise one or more of a data port, a WiFi transceiver, a Bluetooth transceiver, a Radio Frequency (RF) transceiver, and the like. In some embodiments, the network adapter 330 may comprise a one-way transmitter/data port that only provides data to a control unit and does not receive data. In some embodiments, the network adapter 330 may be a transceiver and the control circuit 310 is configured to be turned on and off, collect weight data, and/or change weight thresholds based on communications with a control unit. In some embodiments, the network adapter 330 may be turned on in response to the detection of low syrup level and/or the detection of syrup container replacement as determined by the control circuit. In some embodiments, the network adapter 330 may continuously transmit weight measurements to another device such as a control unit.

In some embodiments, a beverage dispenser monitoring unit 300 may be placed under each syrup container being monitored. In some embodiments, a control circuit 310 may be connected to a plurality of weight sensors 320 each configured to be placed under a different syrup container. In some embodiments, the beverage dispenser monitoring unit 300 may comprise an Internet of Things (IoT) device. In some embodiments, the beverage dispenser monitoring unit 300 may comprise a stateless device that relays weight measurements from the weight sensor to another device. In some embodiments, the beverage dispenser monitoring unit 300 may comprise a mesh network device that is configured to relay data transmitted from other devices towards a control unit.

In some embodiments, a system for controlling beverage quality comprises a beverage dispenser monitoring unit comprising: a plurality of weight sensors each positioned below one of a plurality of syrup containers connected to a beverage dispenser, and a first network adapter configured to communicate with a control unit. The control unit comprises a second network adapter configured to communicate with the beverage dispenser monitoring unit and a plurality of user interface devices, and a control circuit coupled to the second network adapter and configured to: detect a low weight reading from a weight sensor of the plurality of weight sensors of the beverage dispenser monitoring unit via the second network adapter, determine a syrup container of the plurality of syrup containers associated with the weight sensor, and provide a notification of low syrup level indicating the syrup container to at least one of the plurality of user interface devices.

In some embodiments, a method of controlling beverage quality comprises communicatively coupling, via a network adapter coupled to a control circuit of a control unit, with a beverage dispenser monitoring unit comprising a plurality of weight sensors each positioned below one of a plurality of syrup containers connected to a beverage dispenser, detecting, with the control circuit, a low weight reading from a weight sensor of the plurality of weight sensors of the beverage dispenser monitoring unit via the network adapter, determining a syrup container of the plurality of syrup containers associated with the weight sensor, and providing a notification of low syrup level indicating the syrup container to at least one of a plurality of user interface devices via the network adapter.

In some embodiments, an apparatus for controlling beverage quality comprises a non-transitory storage medium storing a set of computer readable instructions and a control circuit configured to execute the set of computer readable instructions which cause to the control circuit to communicatively couple, via a network adapter, with a beverage dispenser monitoring unit comprising a plurality of weight sensors each positioned below one of a plurality of syrup containers connected to a beverage dispenser, detect, with the control circuit, a low weight reading from a weight sensor of the plurality of weight sensors of the beverage dispenser monitoring unit via the network adapter. determine a syrup container of the plurality of syrup containers associated with the weight sensor, and provide a notification of low syrup level indicating the syrup container to at least one of a plurality of user interface devices via the network adapter.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for controlling beverage quality comprising:
   a beverage dispenser monitoring unit comprising:
      a plurality of weight sensors each positioned below one of a plurality of syrup containers connected to a beverage dispenser; and
      a first network adapter configured to turn on in response to a detection of a low syrup level by a weight sensor of the plurality of weight sensors and communicate with a control unit; and
   the control unit comprising:

a second network adapter configured to communicate with the beverage dispenser monitoring unit via the first network adapter and a plurality of user interface devices; and a control circuit coupled to the second network adapter and configured to:
detect a low weight reading from a weight sensor of the plurality of weight sensors of the beverage dispenser monitoring unit via the second network adapter;
determine a syrup container of the plurality of syrup containers associated with the weight sensor; and
provide a notification of low syrup level indicating the syrup container to at least one of the plurality of user interface devices.

2. The system of claim 1, wherein the plurality of syrup containers comprises bag in box containers stored on shelves apart from the beverage dispenser.

3. The system of claim 1, wherein the beverage dispenser monitoring unit is configured to determine whether weight sensor readings are above or below a weight threshold and communicate with the control unit in response to one of the weight sensor readings falling below the weight threshold.

4. The system of claim 1, wherein the plurality of user interface devices comprises a wall-mounted display panel comprising light indicators each associated with one of the plurality of syrup containers connected to the beverage dispenser.

5. The system of claim 1, wherein the control circuit is further configured to cause a low syrup indicator to be displayed on or near the beverage dispenser.

6. The system of claim 1, wherein the plurality of user interface devices comprises portable devices associated with store associates.

7. The system of claim 1, wherein the control circuit is further configured to select the at least one of the plurality of user interface devices to provide the notification based on one or more of: store associate roles, shift schedules, and task assignments of store associates associated with each of the plurality of user interface devices.

8. The system of claim 1, wherein the notification comprises a task for replacing the syrup container in a store associate task management user interface; and
wherein the control circuit is further configured to:
detect a replacement of the syrup container via the weight sensor of the beverage dispenser monitoring unit; and
close the task in the store associate task management user interface in response to detecting the replacement.

9. The system of claim 1, wherein the control circuit is further configured to:
store historical weight sensor readings from the plurality of weight sensors;
determine an estimated future demand for each of the plurality of syrup containers based on the historical weight sensor readings; and
automatically generate an order for one or more of the plurality of syrup containers based on the estimated future demand.

10. The system of claim 1, wherein the control circuit is further in communication with a plurality of beverage dispenser monitoring units associated with a plurality of beverage dispensers; and wherein the notification further comprises a beverage dispenser identifier.

11. The system of claim 1, wherein one of the plurality of user interface devices comprises a point of sale system configured to display the notification.

12. A method of controlling beverage quality comprising:
detecting, with a beverage dispenser monitoring unit comprising a plurality of weight sensors each positioned below one of a plurality of syrup containers connected to a beverage dispenser, a low weight reading from a weight sensor of the plurality of weight sensors;
turning on a first network adapter of the beverage dispenser monitoring unit and communicatively coupling with a second network adapter of a control unit in response to the low weight reading;
determining, with a control circuit of the control unit, a syrup container of the plurality of syrup containers associated with the weight sensor;
providing, from the control unit, a notification of low syrup level indicating the syrup container to at least one of a plurality of user interface devices via the second network adapter.

13. The method of claim 12, wherein the plurality of syrup containers comprises bag in box containers stored on shelves apart from the beverage dispenser.

14. The method of claim 12, wherein the beverage dispenser monitoring unit is configured to determine whether weight sensor readings are above or below a weight threshold and communicate with the control unit in response to one of the weight sensor readings falling below the weight threshold.

15. The method of claim 12, wherein the plurality of user interface devices comprises a wall-mounted display panel comprising light indicators each associated with one of the plurality of syrup containers connected to the beverage dispenser.

16. The method of claim 12, further comprising:
causing a low syrup indicator to be displayed on or near the beverage dispenser.

17. The method of claim 12, wherein the plurality of user interface devices comprises portable devices associated with store associates.

18. The method of claim 12, further comprising:
selecting at least one of the plurality of user interface devices to provide the notification based on one or more of: store associate roles, shift schedules, and task assignments of store associates associated with each of the plurality of user interface devices.

19. The method of claim 12, wherein the notification comprises a task for replacing the syrup container in a store associate task management user interface; and
wherein the control circuit is further configured to:
detect a replacement of the syrup container via the weight sensor of the beverage dispenser monitoring unit; and
close the task in the store associate task management user interface in response to detecting the replacement.

20. The method of claim 12, further comprising:
storing historical weight sensor readings from the plurality of weight sensors;
determining an estimated future demand for each of the plurality of syrup containers based on the historical weight sensor readings; and
automatically generating an order for one or more of the plurality of syrup containers based on the estimated future demand.

21. An apparatus for controlling beverage quality comprising:
- a non-transitory storage medium storing a set of computer readable instructions; and
- a control circuit configured to execute the set of computer readable instructions which cause to the control circuit to:
    - communicatively couple, via a second network adapter, with a first network adapter a beverage dispenser monitoring unit comprising a plurality of weight sensors each positioned below one of a plurality of syrup containers connected to a beverage dispenser, wherein the first network adapter is configured to turn on in response to a detection of a low weight reading from at least one of the plurality of weight sensors;
    - detect, with the control circuit, a low weight reading from a weight sensor of the plurality of weight sensors of the beverage dispenser monitoring unit via the second network adapter;
    - determine a syrup container of the plurality of syrup containers associated with the weight sensor; and
    - provide a notification of low syrup level indicating the syrup container to at least one of a plurality of user interface devices via the second network adapter.

* * * * *